(12) United States Patent
Mazzurco et al.

(10) Patent No.: US 7,158,720 B1
(45) Date of Patent: Jan. 2, 2007

(54) OPTICAL SHARED PROTECTION RING FOR MULTIPLE SPANS

(75) Inventors: Anthony Mazzurco, Plano, TX (US); Joseph A. Crossett, III, Richardson, TX (US); Scott A. Thompson, Lucas, TX (US)

(73) Assignee: Alcatel, Paris (FR)

( * ) Notice: Subject to any disclaimer, the term of this patent is extended or adjusted under 35 U.S.C. 154(b) by 462 days.

(21) Appl. No.: 09/858,098

(22) Filed: May 15, 2001

(51) Int. Cl.
H04J 14/02 (2006.01)

(52) U.S. Cl. ............... 398/4; 398/3; 398/7; 398/59; 398/83

(58) Field of Classification Search ............... 398/59, 398/1, 2, 3, 4, 5, 7, 83
See application file for complete search history.

(56) References Cited

U.S. PATENT DOCUMENTS

| | | | |
|---|---|---|---|
| 5,179,548 A | 1/1993 | Sandesara | |
| 5,442,623 A | 8/1995 | Wu | |
| 5,805,320 A | 9/1998 | Kuroyanagi et al. | |
| 5,870,212 A | 2/1999 | Nathan et al. | |
| 5,875,272 A | 2/1999 | Kewitsch et al. | |
| 5,884,017 A | 3/1999 | Fee | |
| 5,903,370 A | 5/1999 | Johnson | |
| 5,982,517 A * | 11/1999 | Fishman | 398/59 |
| 5,986,783 A | 11/1999 | Sharma et al. | |
| 6,038,044 A | 3/2000 | Fee et al. | |
| 6,046,833 A * | 4/2000 | Sharma et al. | 398/48 |
| 6,144,633 A | 11/2000 | Ikeda et al. | |
| 6,278,689 B1 | 8/2001 | Afferton et al. | |
| 6,295,146 B1 | 9/2001 | Nathan et al. | |
| 6,400,859 B1 | 6/2002 | de Boer et al. | |
| 6,512,611 B1 | 1/2003 | Phelps et al. | |
| 6,606,427 B1 | 8/2003 | Graves et al. | |
| 6,616,349 B1 | 9/2003 | Li et al. | |
| 6,654,341 B1 | 11/2003 | Chi et al. | |
| 6,683,849 B1 | 1/2004 | Langridge et al. | |
| 6,721,502 B1 | 4/2004 | Al-Salameh et al. | |
| 6,735,392 B1 * | 5/2004 | Elahmadi et al. | 398/7 |
| 6,785,438 B1 | 8/2004 | Lin et al. | |
| 2002/0048066 A1 | 4/2002 | Antoniades, et al. | |
| 2003/0156317 A1 * | 8/2003 | Ruhl et al. | 359/341.1 |
| 2003/0194231 A1 | 10/2003 | Badr | |

FOREIGN PATENT DOCUMENTS

WO 99/23773 A1 5/1999

OTHER PUBLICATIONS

GR-1230-CORE, SONET Bidroctional Line-Switched Ring Equipment Generic Criteria, Issue 4, Dec. 1998, Section 3.7 Bellcore.
GR-253-Core, Synchronous Opitcal Network (SONET) Transport Systems: Common Generic Criteria, Issue 3, Sep. 2000, Section 5.3.2.2, 5.3.3, Telcordia Technologies.

* cited by examiner

Primary Examiner—Leslie Pascal
(74) Attorney, Agent, or Firm—Anderson, Levine & Lintel; Jessica W. Smith; V. Lawrence Sewell (57) ABSTRACT

A communication network is arranged in a ring configuration of network elements (12) coupled by working spans (16) associated protection spans (18), with multiple rings sharing network elements (12a and 12b). A shared protection span (18ab) is coupled between pairs of shared network elements (12a and 12b). A matrix 28 in a shared network element (12a or 12b) can couple any channel from one of the incoming working spans or protection spans to any channel of the shared protection span (18ab).

15 Claims, 10 Drawing Sheets

OPTICAL SHARED PROTECTION RING FOR MULTIPLE SPANS

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to shared protection architectures.

2. Description of the Related Art

Over the last decade, the importance of telecommunications has increased dramatically. In order to accommodate the vast amount of information passed over telecommunications systems, such as the Public Switched Telephone Network (PSTN) and data networks, copper wires are being replaced with optical fibers, which are capable of carrying significantly more information.

A single fiber may transmit information over many different frequencies or "channels" using DWDM (dense wavelength division multiplexing) techniques. Improvements in fiber technology and electronics are increasing the number of channels that may be distinguished over a fiber and, thus, the amount of information that may be passed by a single fiber.

Increases in information bandwidth over a fiber, however, increase the importance of providing mechanisms to bypass failures in the network, until the failure can be corrected. Common failures include, for example, fiber breakages (typically caused by construction activities inadvertently cutting a fiber), fiber disconnects caused by accidents in the central office, and network element failures, such as laser failures.

Figure 1A:
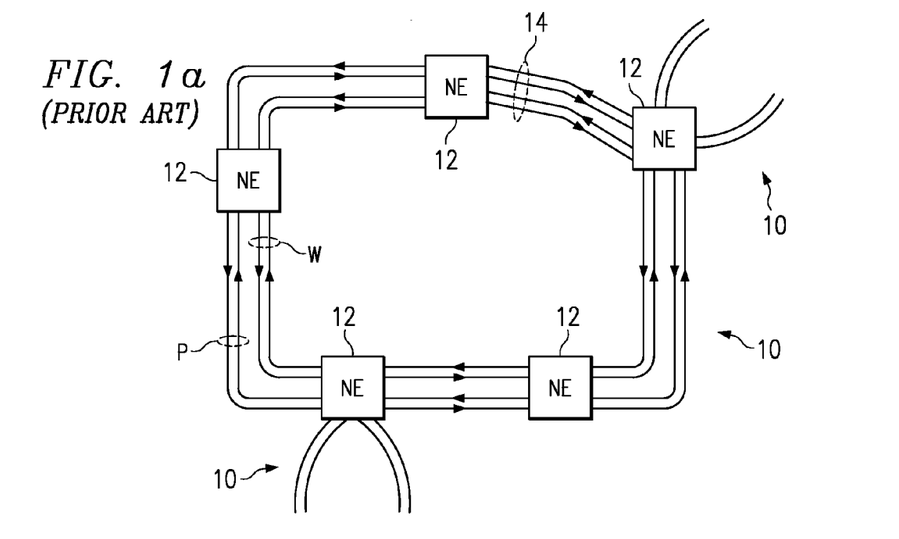
FIGS. 1a and 1b illustrate prior art ring architectures.
Figure 1B:
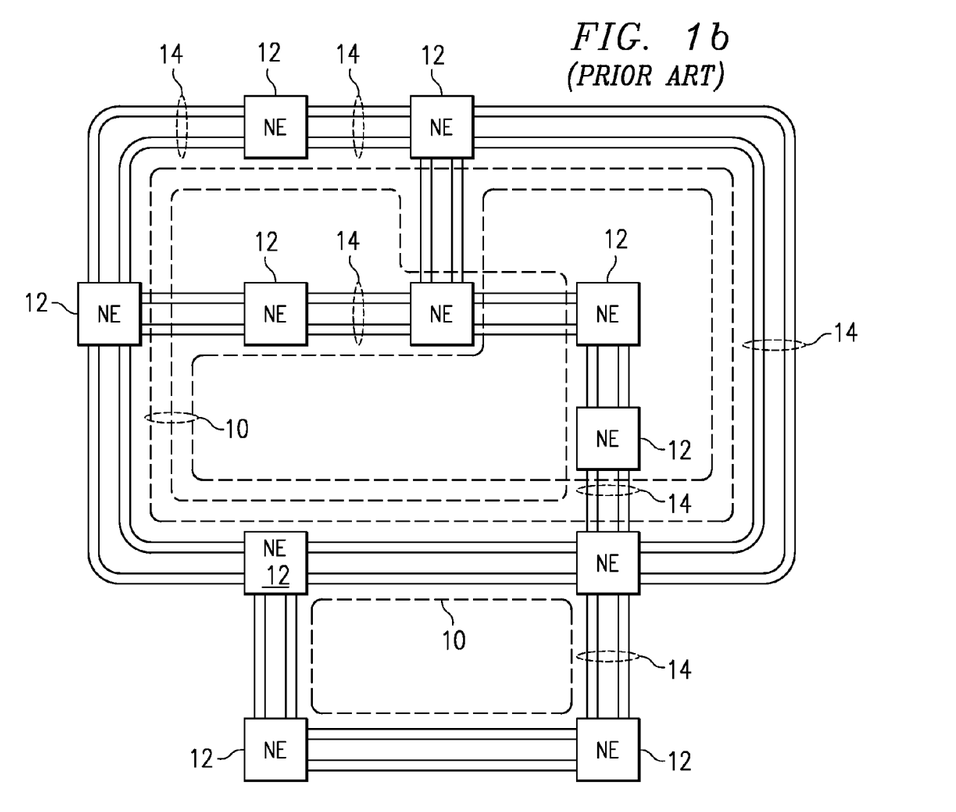

In order to maintain communications in spite of a failure, ring architectures are often used. In a ring architecture, a series of network elements are connected in a ring, such as shown in FIG. 1. Each ring 10 has multiple network elements 12 coupled to one another to form a closed loop. Typically, there are four fibers 14 connecting adjacent network elements 10—two working fibers and two protection fibers, although other configurations are possible. The working fibers (W) carry traffic between adjacent nodes. Protection fibers (P) are available to carry traffic in the event of a working fiber failure. The protection fibers also convey control information between network elements; when not being used for traffic, the protection fibers may carry low-priority interruptible traffic. As shown in FIG. 1, network elements 12 may be shared between different rings.

The ring architecture shown in FIG. 1a is a very simple architecture. In many circumstances, multiple rings 10 may connect various network elements 12 as shown in FIG. 1b. Failures of a working fiber in any of the rings 10 may cause protect lines in multiple rings to be used.

Figure 2A:
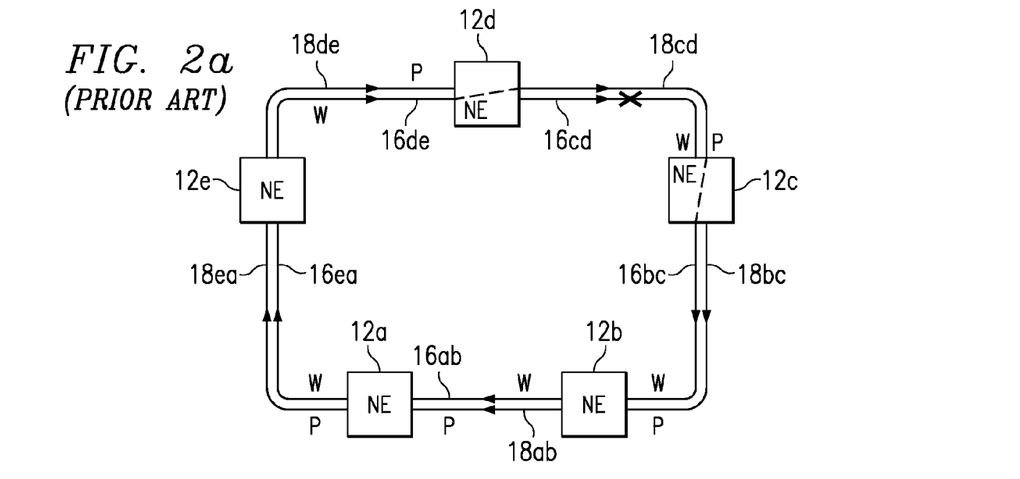
FIGS. 2a and 2b illustrate prior art span switches and ring switches, respectively.

FIG. 2a illustrates one prior art method of circumventing a failure of a working fiber W. In this embodiment, a ring 10 having five network elements 12 (referenced individually as network elements 12a–12e) has a broken working fiber W between network elements 12c and 12d. For purposes of illustration, only one working fiber W and one protection fiber P is shown, it being understood that a similar pair of working and protection fibers are used for traffic in the opposite direction. To pass traffic between network elements 12c and 12d, network element 12d connects the working lines 16de to protect lines 18cd and network element 12c connects working lines 16bc to protect lines 18cd. In other words, traffic that would normally be routed over working lines 16cd is switched to the associated protect lines 18cd. This is referred to as a "span" switch.

Figure 2B:
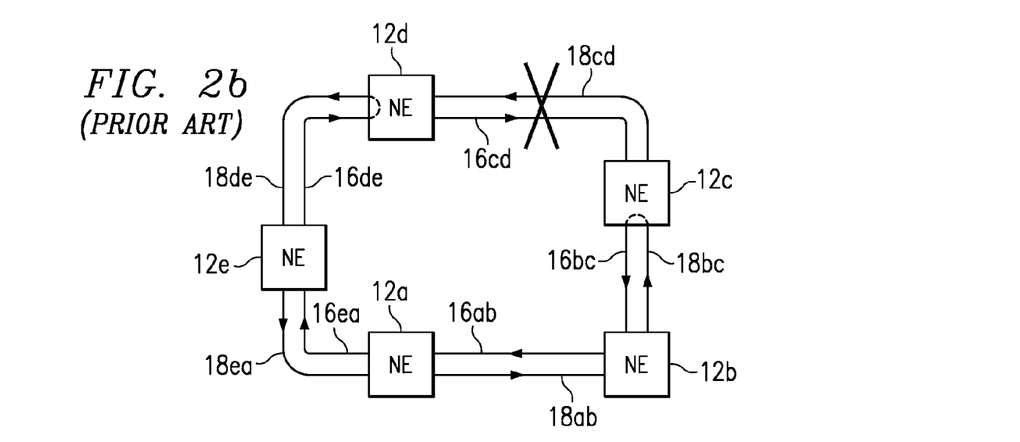

FIG. 2b illustrates a situation where both the working and protection lines have failed between network elements 12c and 12d. In this case, a "ring" switch is implemented where working line 16de is rerouted to protect line 18de and working line 16bc is rerouted to protect line 18bc. Accordingly, the remaining viable protect lines all carry traffic. Every network element can still communicate with all the other network elements 12 on the ring.

Figure 3:
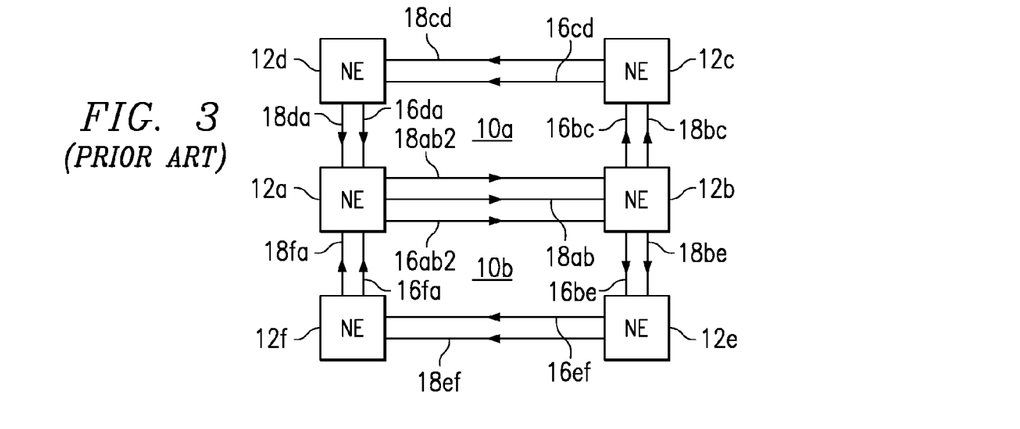
FIG. 3 illustrates a prior art shared protection scheme.

FIG. 3 illustrates an architecture wherein two rings 10a and 10b share a path between network elements 12a and 12b. In WO 99/23773 (PCT/IB98/01955) to Elahmadi et al, the use of a single physical span between these two network elements is proposed. This single span provides protection for two rings 10a and 10b. A failure on either ring can be remedied by using the shared protect line 18ab to carry traffic. This architecture reduces costs, which can be significant if the distance between the shared network elements is long (or there are other infrastructure costs involved), but increases the chance of a traffic outage if another failure occurs on another ring. With more complicated ring architectures, with multiple physical rings using a common span, the chances of multiple concurrent failures on multiple rings can become significant.

Therefore, a need has arisen for a method and apparatus for sharing protect lines while maintaining reliability of the network.

BRIEF SUMMARY OF THE INVENTION

In the present invention, a communications network comprises a pair of network elements coupled by two or more working spans for carrying communications traffic between the pair of network elements, each working span carrying the communications traffic over a plurality of channels associated with one or more rings. A shared protection span is coupled between the network elements, providing a plurality of channels in excess of the number of channels of one or more of the working spans. The network elements include circuitry for concurrently switching communication traffic on rings associated with different working spans to respective channels of the shared protection span.

The present invention provides significant advantages over the prior art. A single shared protection span can be used to carry communications traffic from multiple rings, even if all channels supported by a single work span fail, since the protection span has a higher capacity than the incoming spans.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 4–12 of the drawings, like numerals being used for like elements of the various drawings.

Figure 4:
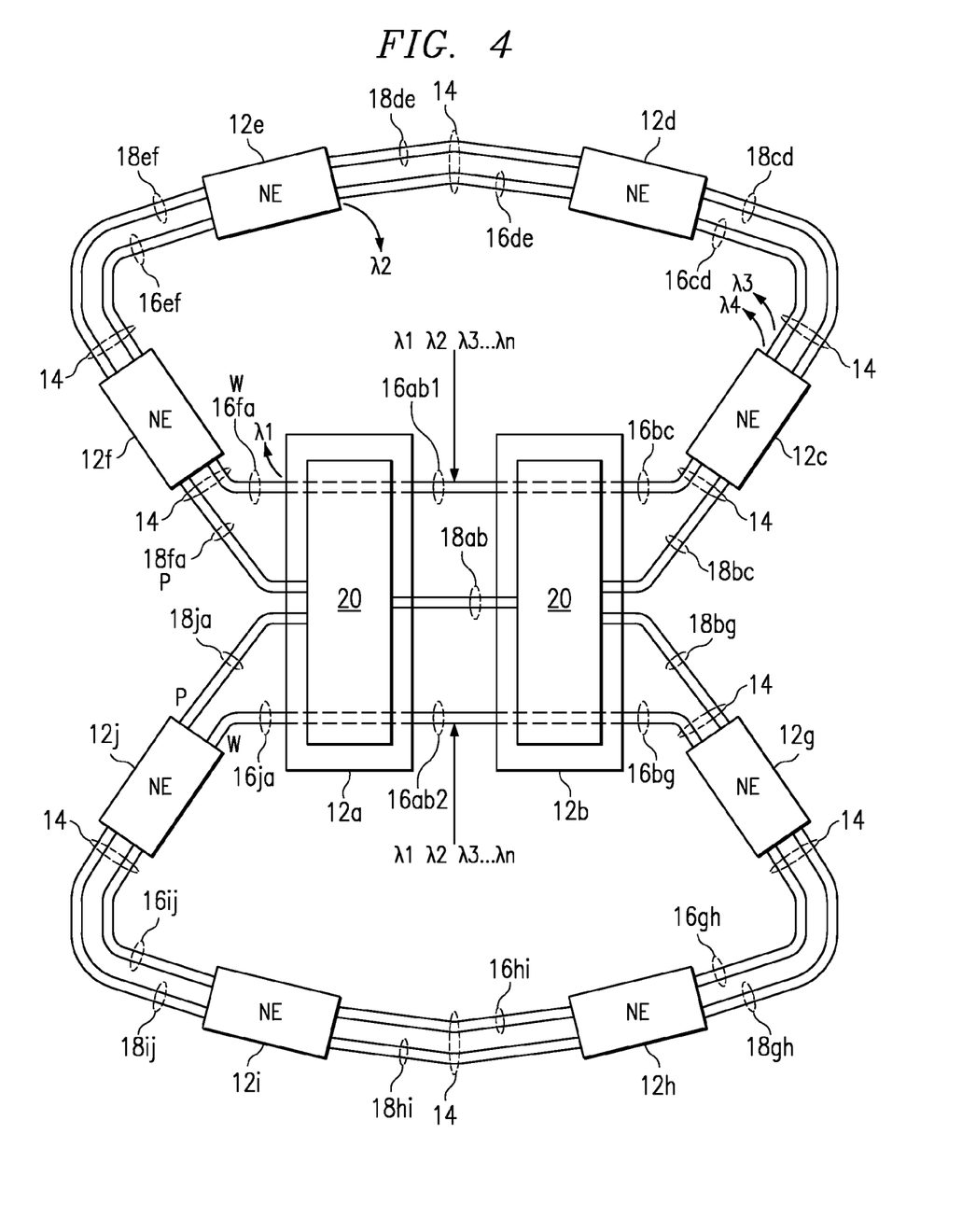
FIG. 4 illustrates a shared protection scheme in accordance with the present invention.

FIG. 4 illustrates a diagram of two spans supporting multiple rings with a common protection span with no failure. Each pair of adjacent optical network elements 12 (individually referenced as 12a–j), except between network elements 12a and 12b, are connected by a pair of working lines 16 and a pair of protect lines 18. Network elements 12a and 12b are optical cross connects that share a span between multiple rings—hence, there are two pair of working fibers 16ab1 and 16ab2 between these network elements and single pair of shared protect fibers 18ab. Network elements 12a and 12b include switching circuitry 20 that may switch any channel or group of channels from any of the associated working spans (working spans 16fa and 16ja for network element 12a and working spans 16bc and 16bg for network element 12b) or from any of the associated protection spans (working spans 18fa and 18ja for network element 12a and working spans 18bc and 18bg for network element 12b) to any available channel or channels on the shared protection span 18ab.

Each of the working spans 16ab1 and 16ab2 are shown are supporting n wavelengths or, in other terms, n distinct channels. For each individual span, n could be a different number; for example working span 16ab1 could support sixteen frequencies and working span 16ab2 could support forty frequencies. Each wavelength of the working spans sharing protection, i.e., working spans 16ab1 and 16ab2, supports its own protection ring within the network. These rings are not necessarily supported on the same physical working fibers over the extent of each ring. In FIG. 4, different optical wavelengths (channels) are shown as split out from a network element. For example, in FIG. 4, $\lambda 1$ is shown as split out from network element 12a, $\lambda 2$ is shown as split out from network element 12e and $\lambda 3$ and $\lambda 4$ are shown as split out from network element 12c. The splitting denotes that the ring for that particular wavelength is continued on a different fiber and, thus, a different physical ring. Accordingly, in FIG. 4, the channels $\lambda 1$–$\lambda n$ of sharing working span 16ab1 support four different physical rings: (1) the ring including $\lambda 1$ (entire ring is not shown), (2) the ring including $\lambda 2$ (entire ring is not shown), (3) the ring including $\lambda 3$ and $\lambda 4$ (entire ring is not shown), and (4) the ring including $\lambda 5$–$\lambda n$ (entire ring is shown).

Another point to note is that a logical channel may be carried on a specific wavelength over one span and at a different wavelength at another span. Thus, a logical channel may switch transmission frequencies between different spans in the ring. In general, optical cross connects can perform wavelength translation. Thus, while each channel is represented in the figures by a different $\lambda$ for notation convenience, the data may be transmitted using different frequencies over different spans of its protection ring.

Figure 5:
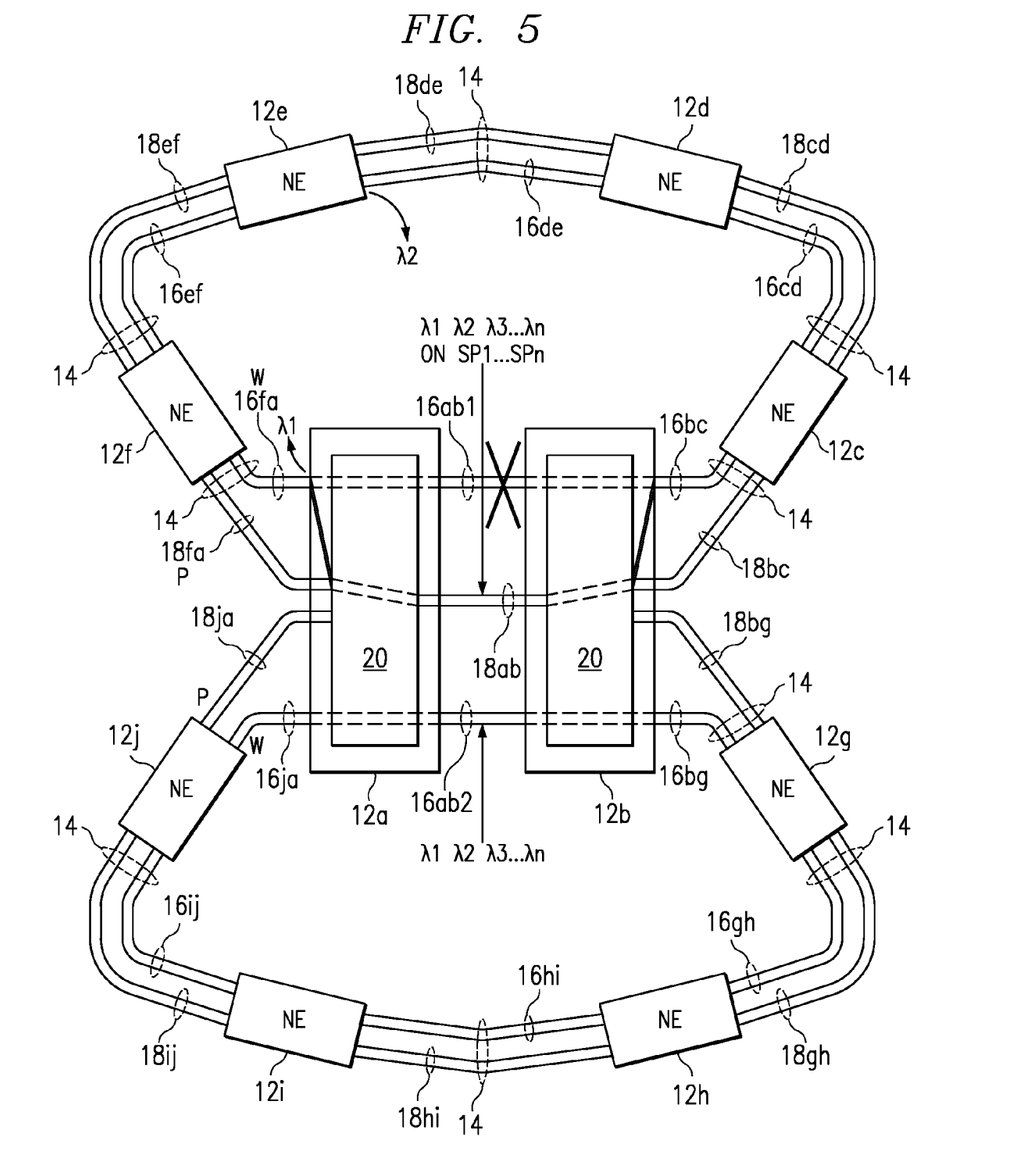
FIG. 5 illustrates a span switch using a shared protection span.

FIG. 5 illustrates a situation where one of the sharing working spans, namely working span 16ab1 fails. Upon failure of the working span 16ab1, all channels $\lambda 1 \ldots \lambda n$ for that span are routed through the protection span 18ab on corresponding shared protection channels SP1 . . . SPn. Thus, working spans 16fa and 16bc are coupled to the shared protect span 18ab via network elements 12a and 12b, respectively. As discussed above, the frequencies used for each channel $\lambda 1$ though $\lambda n$ on protect span 18ab may be different than the frequencies used on the respective channels for working spans 16fa and 16bc.

Figure 6:
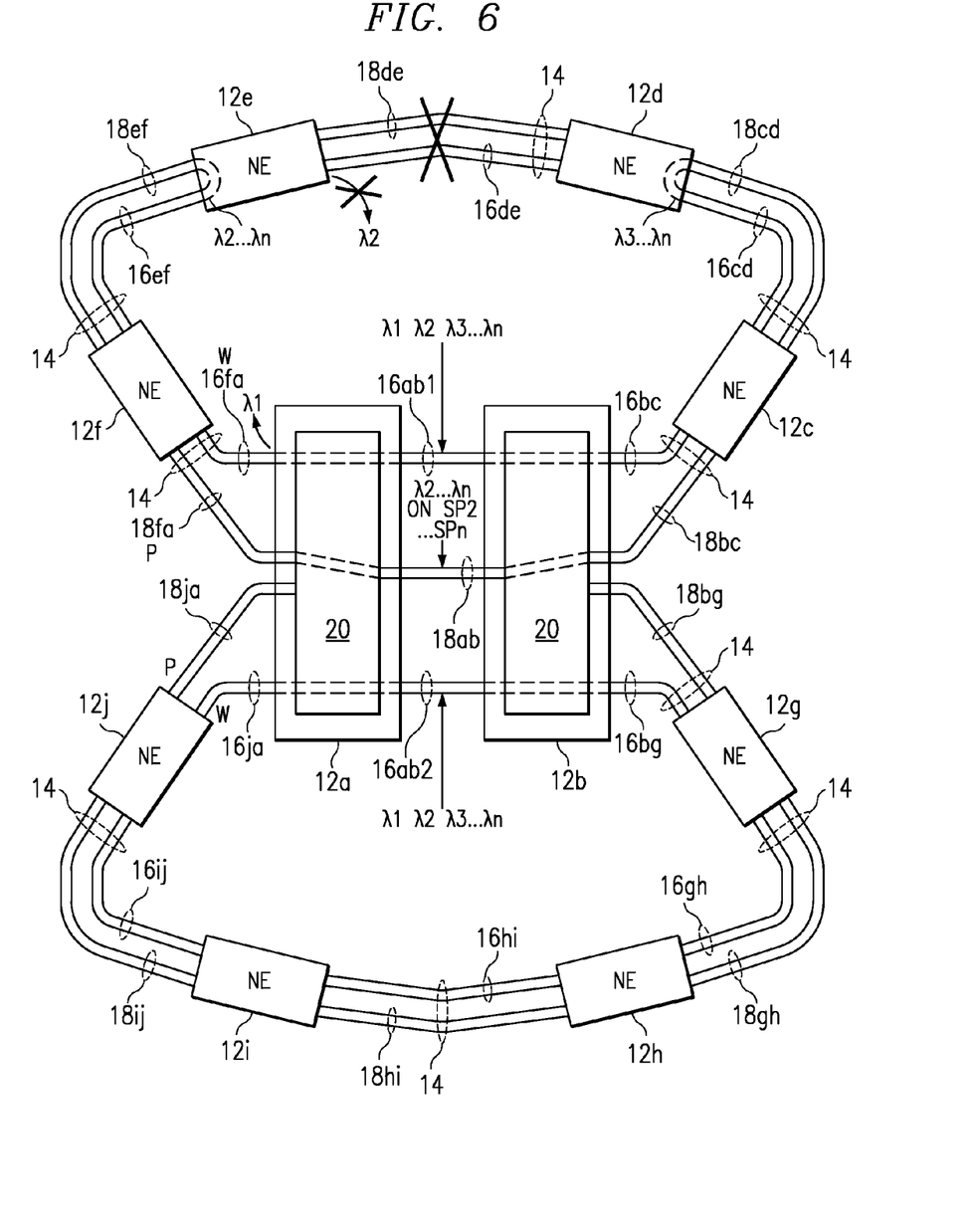
FIGS. 6 through 9 illustrate different configurations of ring switches used to restore communications after failure of one or more channels of various rings.

In FIG. 6, all channels $\lambda 2$-$\lambda n$ fail between network elements 12d and 12e (channel $\lambda 1$, which is split out at network element 12a, is not affected). Ring switches are implemented at network elements 12e and 12c, as well as the network element (not shown) that supports the other end of the $\lambda 2$ span failure, to maintain communication to all the network elements on the ring. To complete the ring switch, protect spans 18fa and 18bc are coupled to the shared protect span 18ab to communicate channels $\lambda 2 \ldots \lambda n$ on corresponding shared protection channels SP2 . . . SPn. Once again, the frequency of each channel $\lambda 2$ though $\lambda n$ may be different on protect span 18ab than it is on the protect spans 18fa and 18bc.

Figure 7:
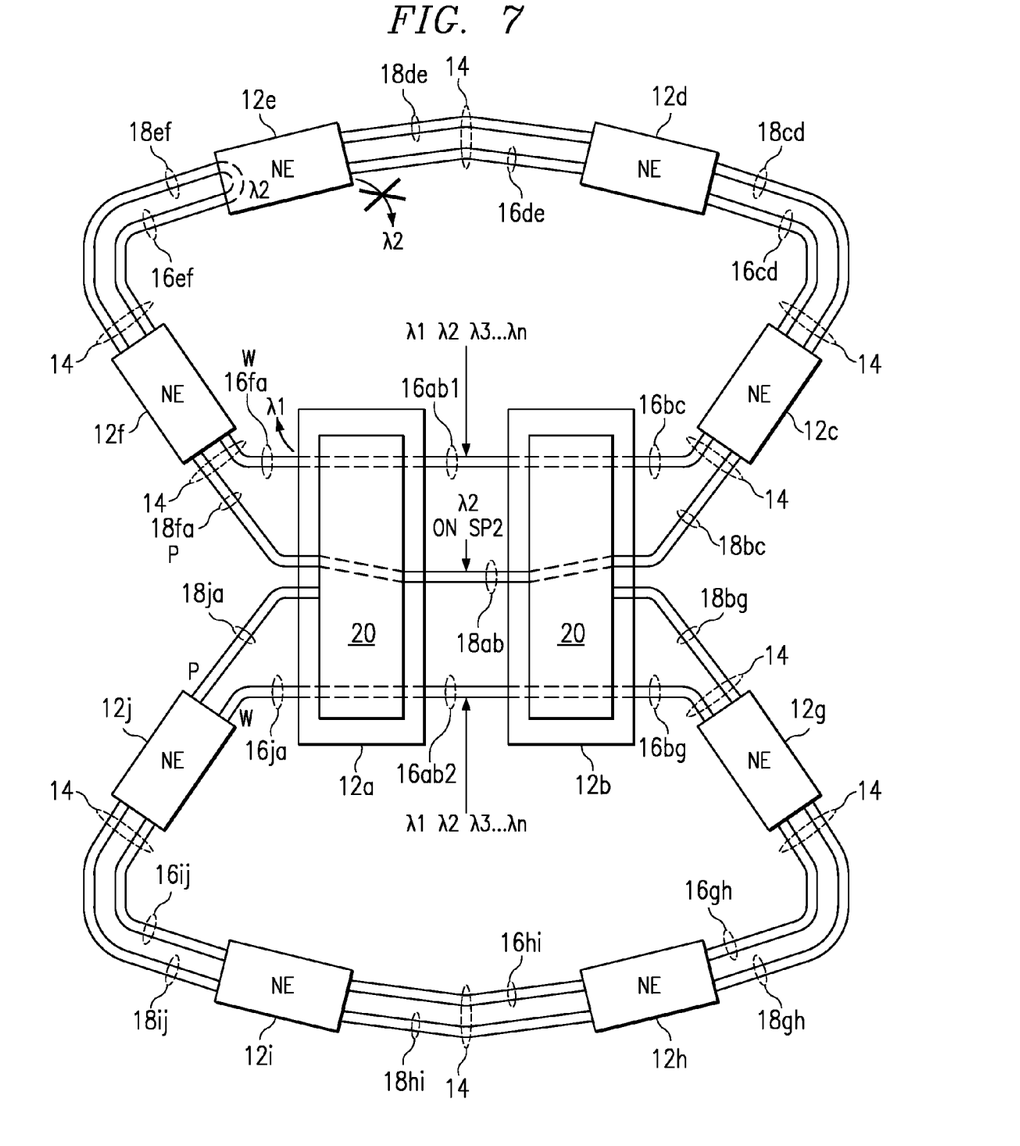

FIG. 7 illustrates a situation where there is failure of a single channel, $\lambda 2$, supported by sharing working fiber 16ab1. In the illustrated case, $\lambda 2$ fails between network element 12e and another network element (not shown). The failure of $\lambda 2$ causes ring switches on network element 12e and the network element on the other said of the failed span for channel $\lambda 2$ (the remaining channels pass through network element 12e as normal). Since one of the channels on protect spans 18ef and 18fa is used in conjunction with the ring switch to carry traffic for $\lambda 2$, network element 12a passes traffic for $\lambda 2$ from protect span 18fa to shared protect span 18ab and network element 12b passes traffic for $\lambda 2$ from shared protect span 18ab to shared protect span 18bc on shared protection channel SP2 (or any other available channel). The remaining channels on protect span 18ab can be used to carry control information and low-priority traffic for other rings as usual.

Figure 8:
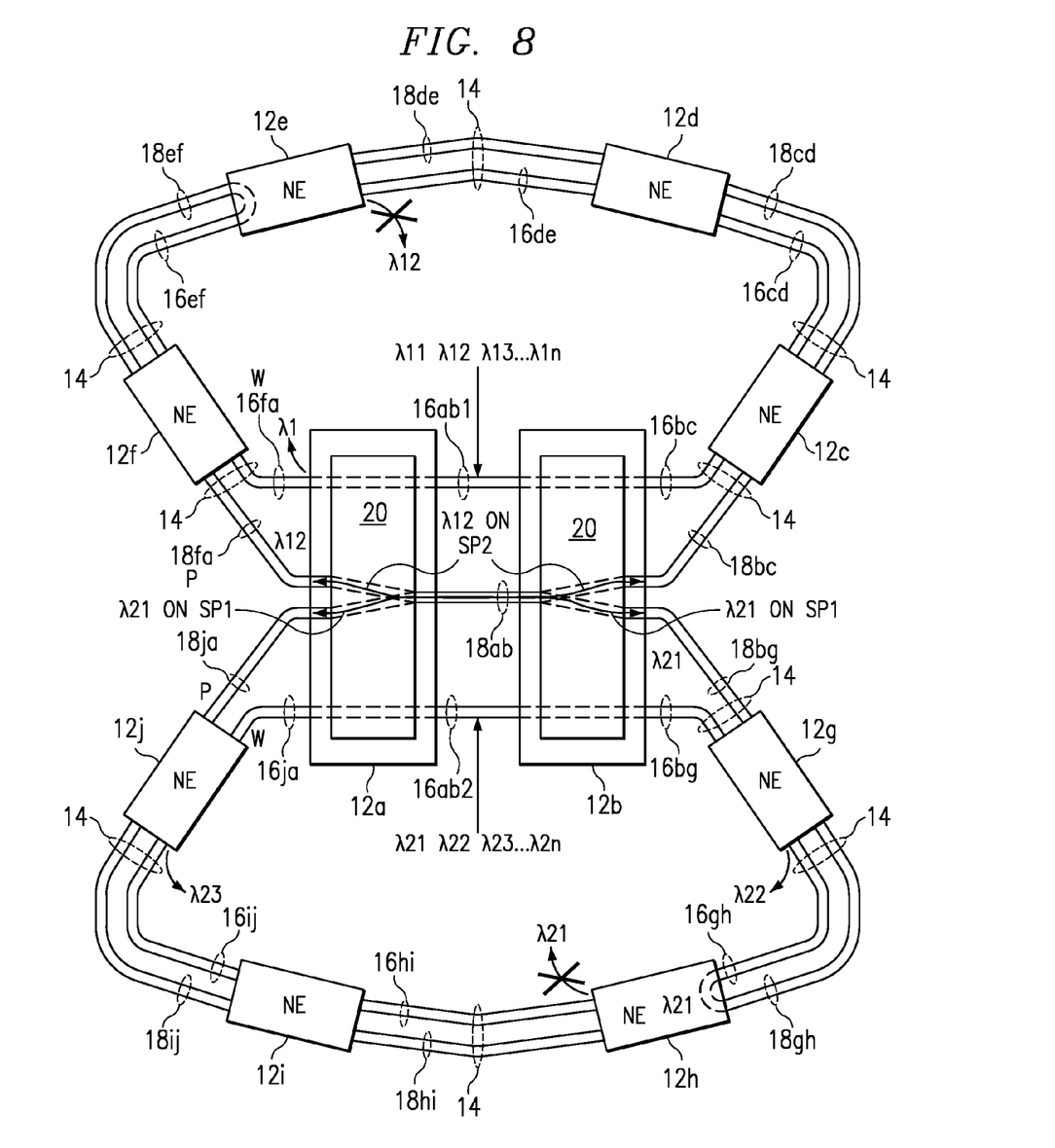

FIG. 8 illustrates a situation similar to that shown in FIG. 7, with the difference that channels associated with different sharing working spans have failed. To differentiate channels over different sharing working spans, channels are denoted as $\lambda SC$, where S represents a sharing working span and C represents a channel. Hence channel $\lambda 12$ is the second channel of span 16ab1 and channel $\lambda 21$ is the first channel of Span 16ab2. In FIG. 8, in addition to the failure of $\lambda 12$ shown in FIG. 7, $\lambda 21$ has also failed.

To provide communications over $\lambda 12$, the ring switch is effected at network element 12e, as described above in connection with FIG. 7. Furthermore, network element 12a passes traffic for $\lambda 2$ between protect span 18fa and shared protect span 18ab and network element 12b passes traffic for $\lambda 2$ between protect span 18ab and shared protect span 18bc. In the illustrated embodiment, shared protection channel SP2 is used to communicate channel $\lambda 12$.

For λ21, a ring switch is provided at network element 12h to couple working lines 16gh to corresponding protect lines 18gh (and another ring switch is provided at the network element on the other side of the failed span). Network element 12b passes traffic for λ21 between protect span 18bg and shared protect span 18ab and network element 12a passes traffic for λ21 between protect span 18ab and shared protect span 18ja. Shared protection channel SP1 is used to communicate channel λ21.

Accordingly, the shared protect span can be used to correct simultaneous failures on both rings. In operation, multiple failures on multiple rings can be accommodated at discussed in greater detail below.

Figure 9:
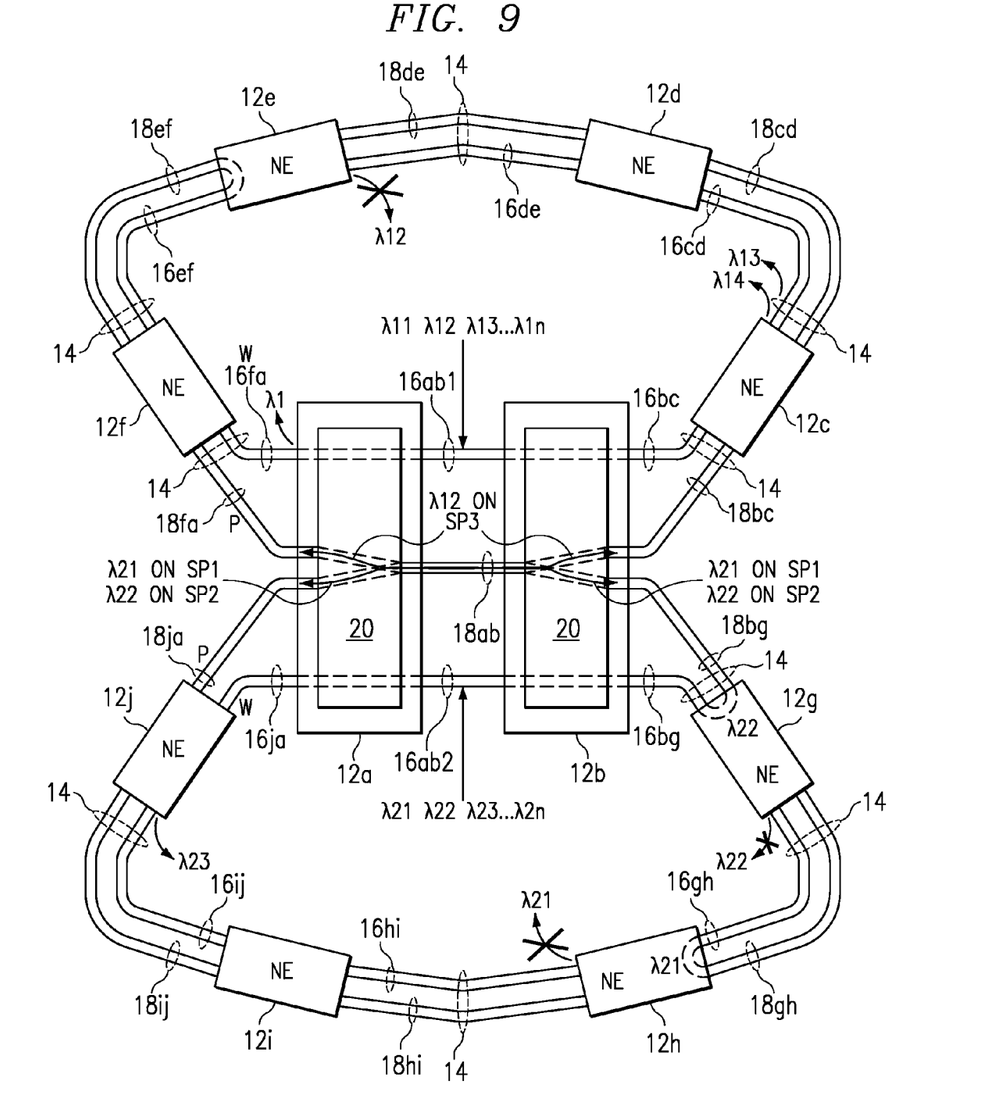

In FIG. 8, it is assumed that channel λ12 and λ21 normally operate on different frequencies and that the shared protection spans 18ab can communicate the information associated with these channels on their normal frequencies. FIG. 9 illustrates a situation where channels that normally use the same frequency, i.e., channels λ12 and λ22, both experience failures at the same time.

In FIG. 9, channel λ12 fails at the same time that channels λ21 and λ22 fail. In this case, channels λ12 and λ22, which are carried at the same frequency on different sharing working spans 16ab1 and 16ab2, cannot both use shared protection channel SP2. In the illustrated embodiment, λ21 and λ22 are switched to shared protection channels SP1 and SP2 on shared protection span 18ab using network elements 12a and 12b. Channel λ12 is switched to shared protection channel SP3.

The present invention provides significant advantages over the prior art. A shared protection line can protect failed channels from multiple rings up to the number of channels available on the shared protection span.

Figure 10:
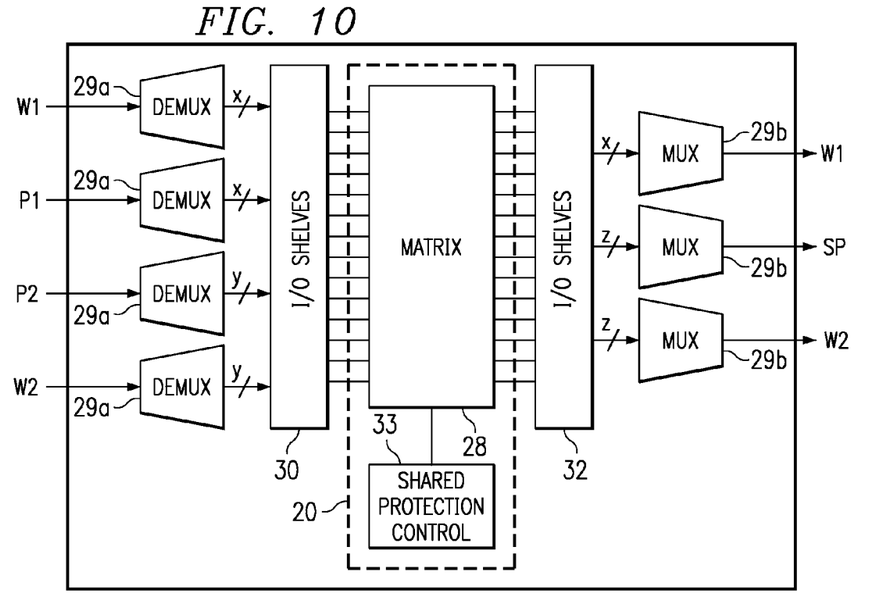
FIG. 10 illustrates a block diagram of an optical cross connect having frequency translation capabilities.
Figure 11:
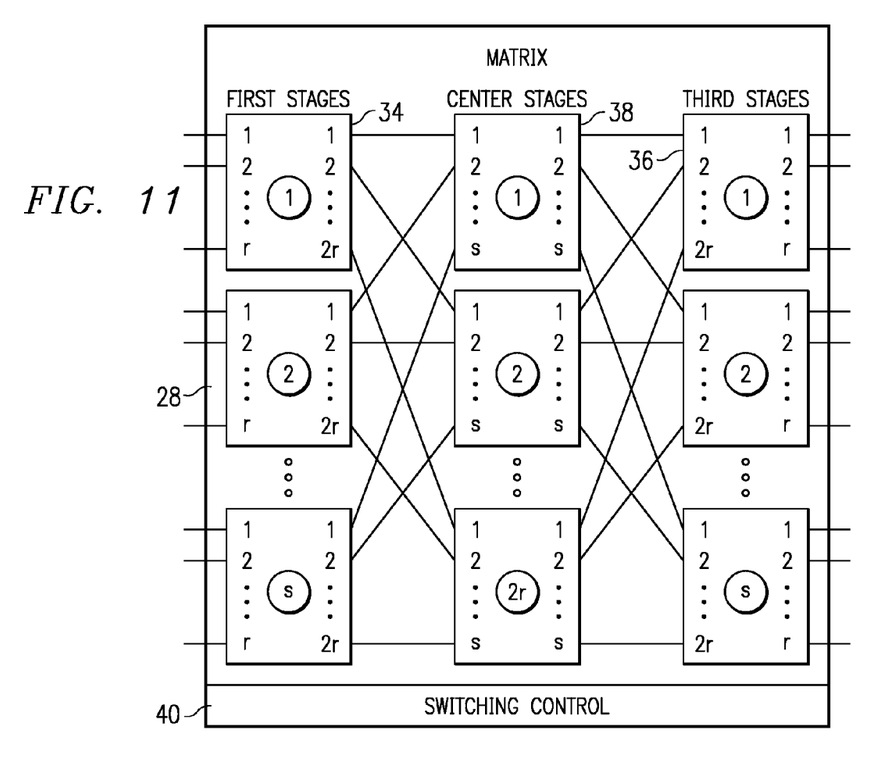
FIG. 11 illustrates a non-block matrix used in the optical cross connect of FIG. 10.

FIG. 10 illustrates a network element for supporting shared protection lines, such as those shown in FIGS. 4–9. The network element includes a matrix 28 that has multiple inputs and multiple outputs. In the illustrated embodiment, incoming working span W1 and associated protection span P1 each supports x distinct channels and working span W2 and associated protection span P2 each supports y distinct channels. Outgoing shared protect span SP supports z distinct channels. Matrix 28 has at least 2(x+y) inputs and x+y+z outputs. Any input can be connected to any output. A more detailed block diagram of the matrix 28 is shown in FIG. 11. A discussion of the relationship of z to x and y is provided in connection with FIG. 12.

Demultiplexers 29a and I/O shelves 30 are connected between the incoming fibers (W1, W2 and P1 and P2, where W1 and W2 are the incoming working spans and P1 and P2 are the respective incoming protection spans) and the inputs of matrix 28. The demultiplexers 29a receive the multiplexed channels on the incoming fibers, such as W1, W2, P1 and P2, and demultiplex the multiple channels on each fiber into separate optical data streams. The matrix 28 receives each distinct optical data stream at its inputs and passes the stream to the desired output. Each output of the matrix 28 is coupled to a port on an I/O shelf 32, which passes the outputs to a multiplexer 29b. The multiplexers 29b perform the DWDM multiplexing of the channels onto a fiber. Hence, for each data stream from the matrix 28, the multiplexers 29b output the data stream onto a fiber using a unique laser frequency for that data stream. While FIG. 10 shows two working spans and two associated protect spans at the input and two working spans and a shared protection span at the output, it would be possible to have more working spans and associated protect spans at the input and corresponding working spans at the output. Further, while it is assumed that there is a single shared protection span at the output of the network element, there could be any number of shared protection spans supporting a larger number of incoming working/protection spans.

Shared protection control circuitry 33 receives signals indicating failed working spans/channels and controls the transfer of channels from the incoming working spans and protections spans coupled to the network elements to the shared protection line 18ab. After a failed span is repaired, shared protection circuitry restores the normal connections.

FIG. 11 illustrates a block diagram of the matrix 28, implementing a conventional non-blocking design, used in the preferred embodiment. In a non-blocking matrix, any matrix input can be connected to any available matrix output, regardless of interconnections between other inputs and outputs of the matrix. The matrix 28 includes s first (originating) stages 34 and s third (terminating) stages 36. Each of the first stages 34 has r inputs and 2r outputs. Each of the third stages 36 has 2r inputs and r outputs. Each first stage 34 provides a two to one expansion, i.e., any of the r inputs of first stage 34 can be connected to any of the 2r outputs of the same first stage 34. Similarly, each third stage 36 provides a two to one compression, i.e., any of the r outputs of a third stage 36 can be connected to any of the 2r inputs of the same third stage 36. Center stages 38 are coupled between the first stages 34 and the third stages 36. There are 2r center stages 38, with each center stage 38 having s inputs and s outputs. The advantage of the architecture shown in FIG. 11 is that it is non-blocking. Regardless of the previously established connections, there will always be a path to connect any of the r*s inputs of matrix 28 to any available output of matrix 28. Switching control 40 uses a connection algorithm for determining the correct path though the stages 34, 36 and 38 based on a requested input port and output port. Because matrix 28 is non-blocking, any channel from any of the working lines can be transferred to any available channel of the shared protection lines.

By using shared protection, it may be necessary to address inherent compromises due to the limited ability to provide protection beyond a certain number of simultaneous failures. Without shared protection, if each span is supported by its own protection fiber, which is the traditional ring approach, then protection can occur on every ring simultaneously. In the case of non-shared protection, each protection span is capable of carrying all the traffic of the respective working span.

For the shared protection approach, if the protection span carries the same number of channels as a working span, multiple failures could exceed the number of available protection channels. Accordingly, in the preferred embodiment, the protection span uses higher capacity DWDM than the associated working spans.

In this embodiment, the protection span can always support multiple failures in its associated working spans, including a catastrophic failure resulting in loss of all channels in at least one of the working spans. A protect span can support concurrent catastrophic failures in all working spans only if it has a number of channels equal to or greater than the number of channels on all supported working spans (assuming that all channels on all working spans are actually being used). This is referred to as a "complete redundancy" case.

Figure 12:
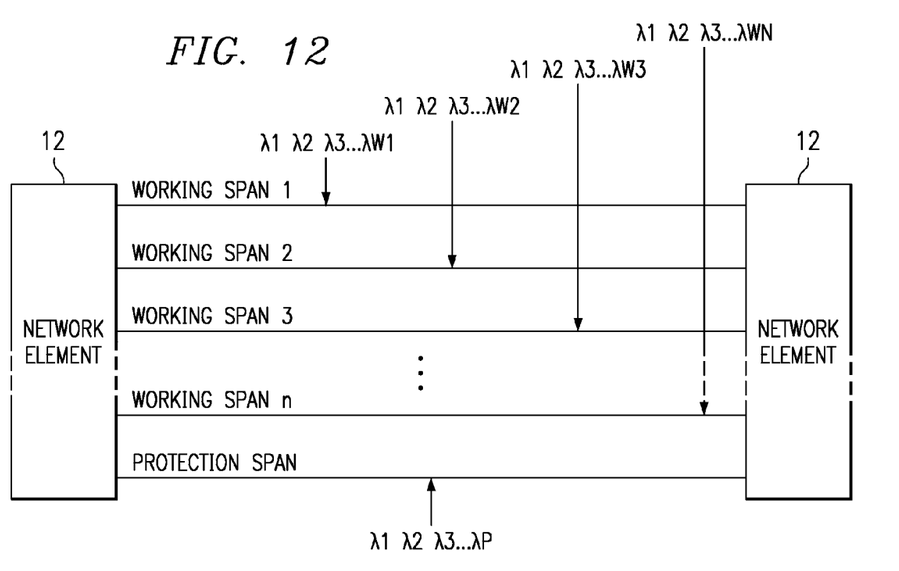
FIG. 12 illustrates a diagram illustrating a protection ratio for determining a desirable number of protection channels.

In some cases, complete redundancy may not be economically or technically advisable. A "protection ratio" is defined herein as the number of optical channels on the protection span divided by the sum of the optical channels on the sharing working spans. This is shown in FIG. 12. In this case, N working spans have individual working capacities (number of channels) of W1 ... WN. The protection span (or spans) has a capacity of P channels. The protection ratio is thus:

$$PR(\text{protection ratio}) = P/(W1+W2+\ldots+WN)$$

If the numerator and denominator are equal, the ratio is equal to "1"; for this protection ratio, the shared protection span provides the same protection capacity as N separate protection groups, each with their own working and protection pairs.

If the ratio is equal to 0.5, then there is one protection channel for every two working channels. Therefore, the system can support failures on half of the working channels before losing traffic.

For network availability, a higher ratio is more desirable, albeit more costly. In practice, the higher ratio is driven by two costs. The network provider must either supply more fibers or, as proposed here, higher channel capacity on the designated protection facilities. Wavelength translation allows multiple protection facilities to be shared among many working facilities without any blocking concerns. This means that any protection channel can support any working channel on any sharing span. By increasing the channel density on the protecting span, more working channels can be simultaneously protected.

The need to have a high ratio may be offset by equipment reliability. In a more reliable network, the ratio may be lowered without compromising network availability. The optimum protection ratio is determined by the network designers.

Once the network provider determines an acceptable ratio, he may either provide additional protection fibers or, as proposed here, increase the capacity on a limited number of protection spans by using higher capacity DWDM only on those spans.

Traditionally, the protection fibers carried the same capacity as the working fibers. By utilizing cross connections and providing wavelength interchange, higher density may be used on protection spans without incurring the cost on the working spans. Generally, the cost for the increased channel capacity is less than the cost of providing new fibers. The cost for the additional capacity can be compared to that of additional fibers.

The proposed process is as follows:
1) Calculate the number of working channels W=(W1+W2+ ... +WN);
2) Based on the desired level of network reliability, calculate a desired protection ratio (PR);
3) The desired number of protection channels is found by PR×W=P.

This calculation is done for every shared span of the rings.

At this point, the channels can be added by either deploying protection spans with the same capacity as working ones or by increasing the capacity on a fewer number of protection spans using more advanced DWDM technology on the protection spans.

With this concept, as an example, four working spans supporting 40 wavelengths can be protected with one share protecting span with 160 wavelengths and still have a protection ratio of 1.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A communications network comprising:
   a pair of network elements;
   two or more working fibers coupled between said pair of network elements for carrying communications traffic between said pair of network elements, each working fiber carrying said communications traffic over a plurality of channels associated with one or more rings;
   a shared protection fiber coupled between said network elements, said shared protection fiber providing a plurality of channels in excess of the number of channels of one or more of the working fibers;
   wherein said network elements include a non-blocking matrix for concurrently switching communication traffic on rings associated with different working fibers to respective channels of said shared protection fiber.

2. The communications network of claim 1 wherein said shared protection fiber provides a plurality of channels in excess of the number of channels of any of the one or more working spans.

3. The communications network of claim 1 wherein at least one of said working fibers carries traffic for multiple ring structures.

4. The communications network of claim 1 wherein each of said pair of network elements is coupled to two or more incoming working fibers and two or more corresponding incoming protection fibers.

5. The communications network of claim 4 wherein each of said pair of network elements includes control circuitry for switching a channel from each of said incoming protection fibers to an available channel of said shared protection fiber.

6. The communications network of claim 5 wherein said control circuitry further is operable to switch a channel from each of said incoming working fibers to θ said shared protection fiber.

7. The communications network of claim 4 wherein each of said pair of network elements includes control circuitry for switching a channel from said shared protection span to a channel on an outgoing protection fiber.

8. The communications network of claim 1 wherein shared protection fiber provides a plurality of channels in excess of the number of channels of any of the one or more working fibers.

9. A network element comprising:
   interface circuitry for coupling to two or more incoming working fibers and two or more respective incoming protection fibers, each of said working fibers operable to carry communications traffic over a plurality of channels associated with one or more rings; and
   switching circuitry for concurrently coupling channels from different incoming protection fibers to a shared protection fiber, said shared protection fiber providing a plurality of channels in excess of the number of channels of one or more of the working fibers.

10. The network element of claim 9 wherein said switching circuitry includes control circuitry for selective switching a channel from an incoming protection fiber to an available channel on said shared protection fiber responsive to control information.

11. The network element of claim 10 wherein said switching circuitry further includes a non-blocking optical matrix.

12. The network element of claim 8 wherein said interface circuitry includes a channel demultiplexer.

13. The network element of claim 12 wherein said interface circuitry further includes a channel multiplexer.

14. The network element of claim 13 wherein said interface circuitry includes input/output shelves coupled to said demultiplexer and said multiplexer.

15. An optical network, comprising:
- a first fiber ring including at least a first node and a second node, wherein the first fiber ring includes a first working fiber, wherein the first working fiber carries a plurality of channels;
- a second fiber ring including at least the first node and the second node, wherein the second fiber ring includes a second working fiber, wherein the second working fiber carries a plurality of channels;
- a shared protection fiber coupled between the first node and the second node, said shared protection fiber providing a plurality of channels in excess of the number of channels of one or more of the working fibers, wherein any channel from the first working fiber from the first fiber ring and any channel from the second working fiber from the second fiber ring can be currently switched to respective channels of the shared protection fiber;
- a first protection fiber for connecting any other nodes on the first fiber ring to the first and second nodes;
- a second protection fiber for connecting any other nodes on the second fiber ring to the first and second nodes; and
- wherein any channel from the first protection fiber from the first fiber ring and any channel from the second protection fiber from the second fiber ring can be currently switched to respective channels of the shared protection fiber.

* * * * *